Jan. 7, 1964 G. B. BYARS, SR., ETAL 3,116,704
CHARCOAL STARTER
Filed Jan. 26, 1962 2 Sheets-Sheet 1

INVENTORS
LAVAUGHN JOHNSON, &
GARNER B. BYARS, SR.
BY
McMorrow, Berman & Davidson
ATTORNEYS

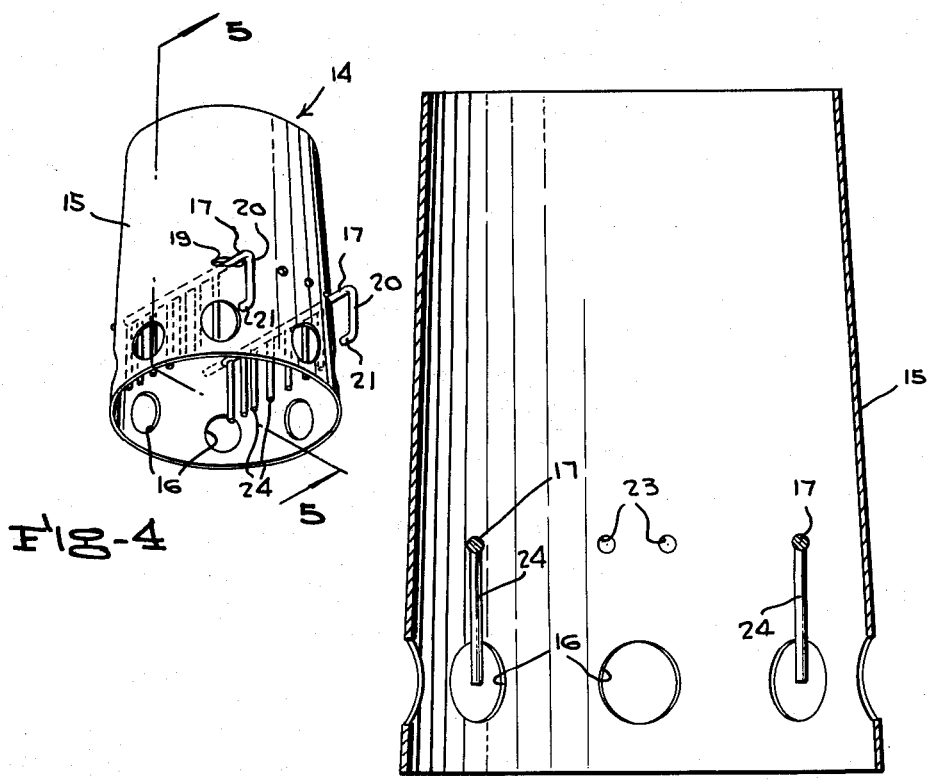
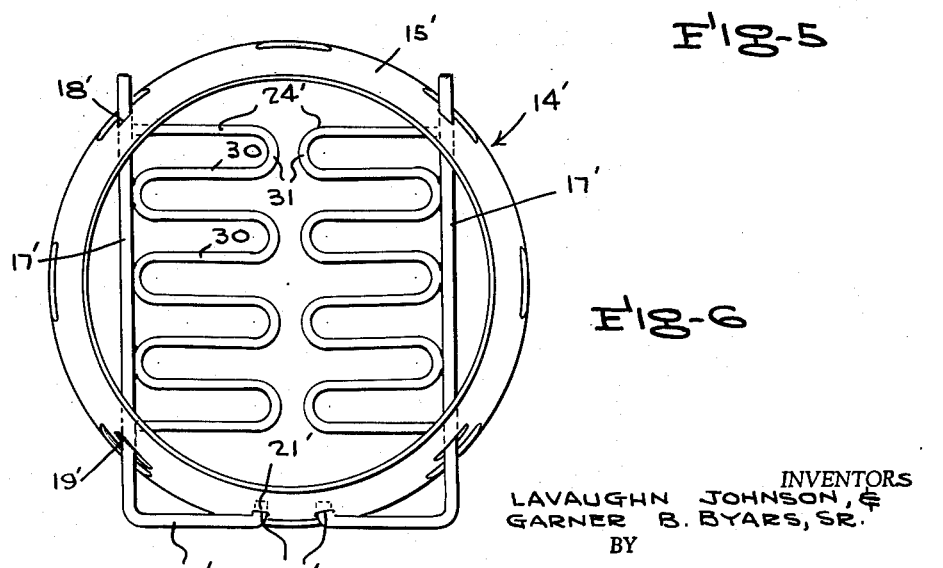

či
3,116,704
CHARCOAL STARTER
Garner B. Byars, Sr. and Lavaughn Johnson, Corinth, Miss., assignors to Auto Fire Coropration, Corinth, Miss., a corporation of Mississippi
Filed Jan. 26, 1962, Ser. No. 169,071
1 Claim. (Cl. 110—1)

This invention relates to fuel ignition devices, and more particularly to a device for igniting charcoal for use in a barbecue type charcoal burner.

A main object of the invention is to provide a novel and improved charcoal igniting device which is relatively simple in construction, which is easy to use, and which assures positvie ignition of charcoal so as to elevate the charcoal to the proper temperature for continued ignition thereof in a charcoal burner of the barbecue type.

A further object of the invention is to provide an improved charcoal ignition device which can be employed with a conventional charcoal burner, the device being relatively inexpensive to fabricate, being durable in construction, and providing a means for igniting charcoal in a relatively short period of time without requiring the use of special starting liquids or other material, other than relatively inexpensive and inflammable material, such as newspaper, or the like.

A still further object of the invention is to provide an improved starting device for use with a conventional charcoal burner of the barbecue type, the device being provided with means for supporting a quantity of charcoal in a position such that the charcoal may be easily ignited, for example, by means of burning newspaper, or similar cheap combustible material placed therein, the starting device being provided with means for depositing the burning charcoal into the charcoal burner in a simple and safe manner, and being arranged so that the starting device can be easily removed after it has performed its intended function.

Further objects and advantages of the invention will become apparent from the following description and claim, and from the accompanying drawings, wherein:

FIGURE 4 is a perspective view of the charcoal starting device illustrated in FIGURES 1 to 3, shown with the grate elements thereof in depending positions.

FIGURE 5 is an enlarged vertical cross sectional view taken substantially on the line 5—5 of FIGURE 4.

FIGURE 6 is an enlarged top plan view, similar to FIGURE 2, but showing a modified form of charcoal starting device constructed in accordance with the present invention.

Figure 1:
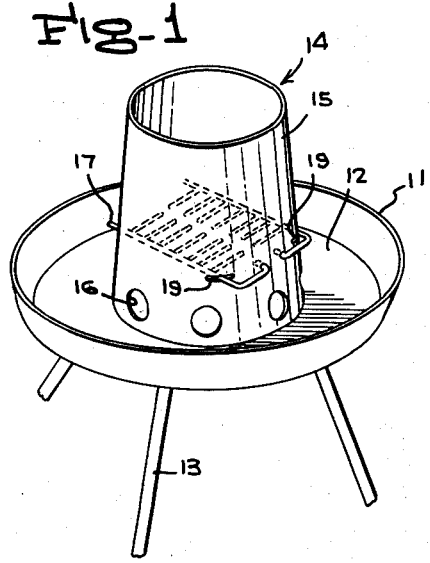
FIGURE 1 is a perspective view of a charcoal burner of the barbecue type provided with an improved charcoal starting device constructed in accordance with the present invention.

Referring to the drawings, and more particularly to FIGURES 1 to 5, 11 designates a conventional charcoal burner of the barbecue type, said burner comprising the generally circular holder or pan 12 provided with the plurality of supporting legs 13 suitably secured to the bottom of the holder 12 and divegring therefrom in the manner illustrated in FIGURE 1, whereby to support the holder 12 in an elevated position.

Designated generally at 14 is a charcoal starting device constructed in accordance with the present invention. The starting device 14 comprises a downwardly flaring tubular housing 15 of sheet metal, provided at its lower portion with a plurality of spaced air intake openings 16.

Figure 2:
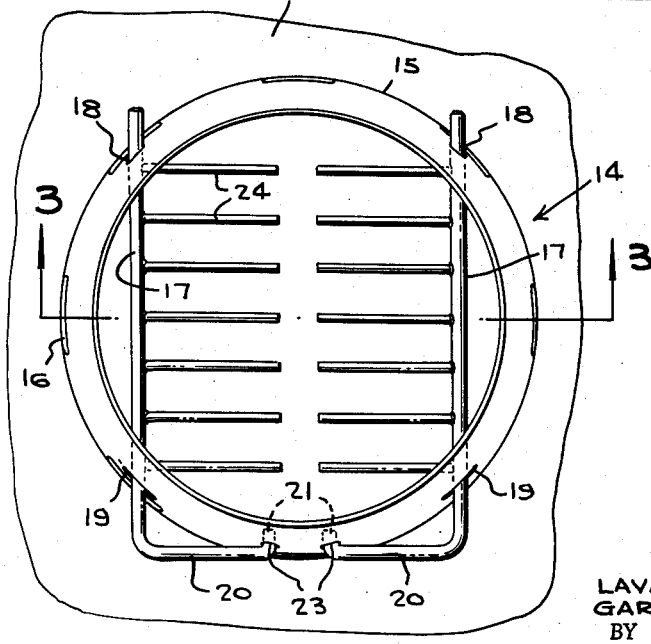
FIGURE 2 is an enlarged top plan view of the charcoal burning device in the position thereof illustrated in FIGURE 1.

Designated at 17, 17 are respective rod members slidably and rotatably supported in the housing 15 above the aperture 16, the rod members 17, 17 being parallel and being located at opposite sides of the housing. The rod members extend through openings 18 and horizontal slots 19 formed in the housing 15, each rod member 17 being provided at one end with a perpendicularly extending arm 20 which terminates in a reversely directed lug 21, as shown in FIGURE 2. The lugs 21 are engageable in openings 23, 23 spaced inwardly from but located in the same horizontal plane as the slots 19, 19.

Figure 3:
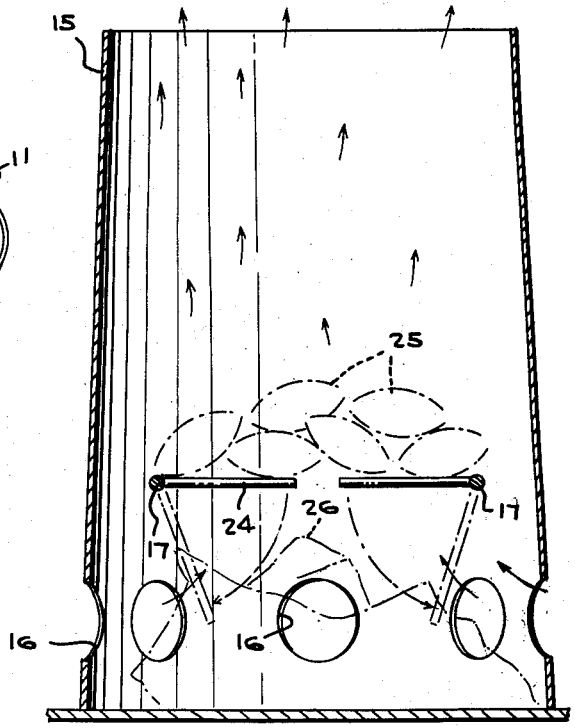
FIGURE 3 is a vertical cross sectional view taken substantially on the line 3—3 of FIGURE 2.

Rigidly secured to each rod member 17 are a plurality of parallel, rigid finger members 24, said finger members extending perpendicular to the associated rod member 17 and being located inside the housing 15, sufficient space being allowed outwardly adjacent the endmost fingers 24 to allow limited longitudinal sliding movement of the associated rod member 17 in its supporting openings 18 and 19. The fingers 24 extend parallel to the arms 20, so that when the lugs 21 are engaged in their associated apertures 23, fingers 24 are supported in horizontal positions directed inwardly toward each other, as shown in FIGURES 2 and 3. The rod member 17 may be pulled outwardly sufficiently to disengage the lugs 21 from the apertures 23, whereby to allow the rod members to rotate and to allow the fingers 24 to drop by gravity to depending positions, such as illustrated in FIGURE 4.

As shown in FIGURE 2, the inner ends of the fingers 24 are located relatively closely adjacent to each other when the rod members 17 are in the positions illustrated in FIGURE 2, so that the fingers 24 of the respective rod members 17, 17 define a supporting grate adapted to support a quantity of charcoal briquettes 25 in positions elevated above the lower portion of the housing 15, namely, in positions wherein they may be heated and ignited responsive to the provision of a flame therebeneath.

As shown in FIGURE 3, the housing 15 is of substantial height, so that a substantial portion of the housing 15 is located above the supporting grate defined by the fingers 24, allowing a substantial draft to be created in the housing 15 when burning material is present in the lower portion of the housing, namely, beneath the horizontally held fingers 24.

In using the device 14, the rod members 17 are arranged in the positions thereof illustrated in FIGURES 1, 2 and 3, namely, with the fingers 24 horizontal, and the device is placed in the charcoal holder 12. A quantity of inflammable material, such as crumpled newspaper, or the like, shown in dotted view at 26 in FIGURE 3, is placed in the lower portion of the housing 15 and the housing is placed on the central part of the bottom wall of holder 12. The charcoal briquettes 25 are then placed on the fingers 24, being supported thereon substantially in the manner illustrated in FIGURE 3. The crumpled newspaper is then ignited by inserting a lighted match through one of the apertures 16, and the combustion of the newspaper creates an intense heat in the region immediately adjacent to the charcoal briquettes 25, the combustion thereof being aided by a draft created by the entry of air through the apertures 16 and the subsequent upward movement of the gaseous products of combustion through the relatively tall stack defined by housing 15. The charcoal 25 may thus be heated to a sufficiently high temperature to cause ignition thereof, without requiring the use of liquid starting material, as has been heretofore required.

After the charcoal briquettes 25 have become ignited, the arms 20 are pulled outwardly to disengage the lugs 21 from the apertures 23, allowing the fingers 24 to drop by gravity to depending positions, and allowing the ignited charcoal briquettes 25 to be deposited on the bottom wall of the holder 12. The device 14 may then be removed, allowing the charcoal burner 11 to be employed in the usual manner.

Referring now to the form of the invention illustrated in FIGURE 6, the device, designated generally at 14' comprises a downwardly flaring, generally tubular housing 15' similar to the housing 15 previously described and apertured in the same manner to support respective parallel rotatable and slidable rod members 17', 17'. As in the previously described form of the invention, the rod members 17' are provided with transversely extending end arms 20' formed at their ends with reversely directed lugs 21' which are engageable in the supporting apertures 23' provided in the housing 15'. The rod members 17' extend through the rear apertures 18' and the horizontal front slots 19', as shown in FIGURE 6.

Rigidly secured to the rod members 17' inside the housing 15' are respective sinuously looped grate elements 24', 24', each grate element 24' comprising a plurality of uniformly spaced, parallel loops 30, corresponding to the spaced parallel fingers 24 of the previously described form of the invention. As shown in FIGURE 6, when the loops 30 are in horizontal positions, they extend inwardly toward each other and their bight portions 31 are relatively closely spaced, thus defining a grate surface adapted to support a quantity of charcoal briquettes 25 thereon in the same manner as is illustrated in FIGURE 3 in connection with the previously described form of the invention.

The looped rods 24' are secured to the straight rod members 17' at locations providing sufficient clearance so that the rod members 17' may be shifted longitudinally sufficiently to disengage the lugs 21' from the supporting apertures 23' when the looped grate-defining members 24', 24' are to be released so that they may swing by gravity to depending positions, whereby the device 14' is operated substantially in the same manner as the device 14 previously described.

While certain specific embodiments of an improved charcoal starting device have been disclosed in the foregoing description, it will be understood that various modifications within the spirit of the invention may occur to those skilled in the art. Therefore it is intended that no limitations be placed on the invention except as defined by the scope of the appended claim.

What is claimed is:

In a charcoal burner of the type having a tubular upwardly tapering housing of substantial height formed at its lower portion with a plurality of air intake apertures and adapted to be positioned in a pan, a grate structure comprising a pair of parallel supporting rods extending through openings in the walls of and slidably and rotatably mounted in the bottom portion of the housing above said air intake apertures, a plurality of spaced coplanar support elements on each of the rods inside the housing, the housing being formed with respective locking apertures spaced horizontally inwardly from the openings for the supporting rods, and respective hooked arms on the ends of the supporting rods, said hooked arms being coplanar with the support elements and being detachably engageable with the locking apertures to hold the rods in posiitons wherein the support elements thereon are substantially horizontal and extend toward each other to define a grate adapted to support a quantity of pieces of charcoal to be ignited, said hooked arms being disengageable from said locking apertures to allow said support elements to drop to depending positions and deposit the ignited charcoal in the pan.

References Cited in the file of this patent

UNITED STATES PATENTS

| 94,986 | Van Hagen | Sept. 21, 1869 |
| 212,010 | Jackson | Feb. 4, 1879 |
| 422,763 | Goodall | Mar. 4, 1890 |
| 654,849 | Scully | July 31, 1900 |
| 950,414 | Sweley | Feb. 22, 1910 |
| 1,298,762 | Milligan | Apr. 1, 1919 |
| 1,966,945 | Bowers | July 17, 1934 |
| 2,920,614 | Phelps | Jan. 12, 1960 |

FOREIGN PATENTS

| 205,682 | Great Britain | Oct. 25, 1923 |